April 9, 1963 J. BOOTH 3,084,947
UNIVERSAL CARRIAGE
Filed May 26, 1961 2 Sheets-Sheet 1
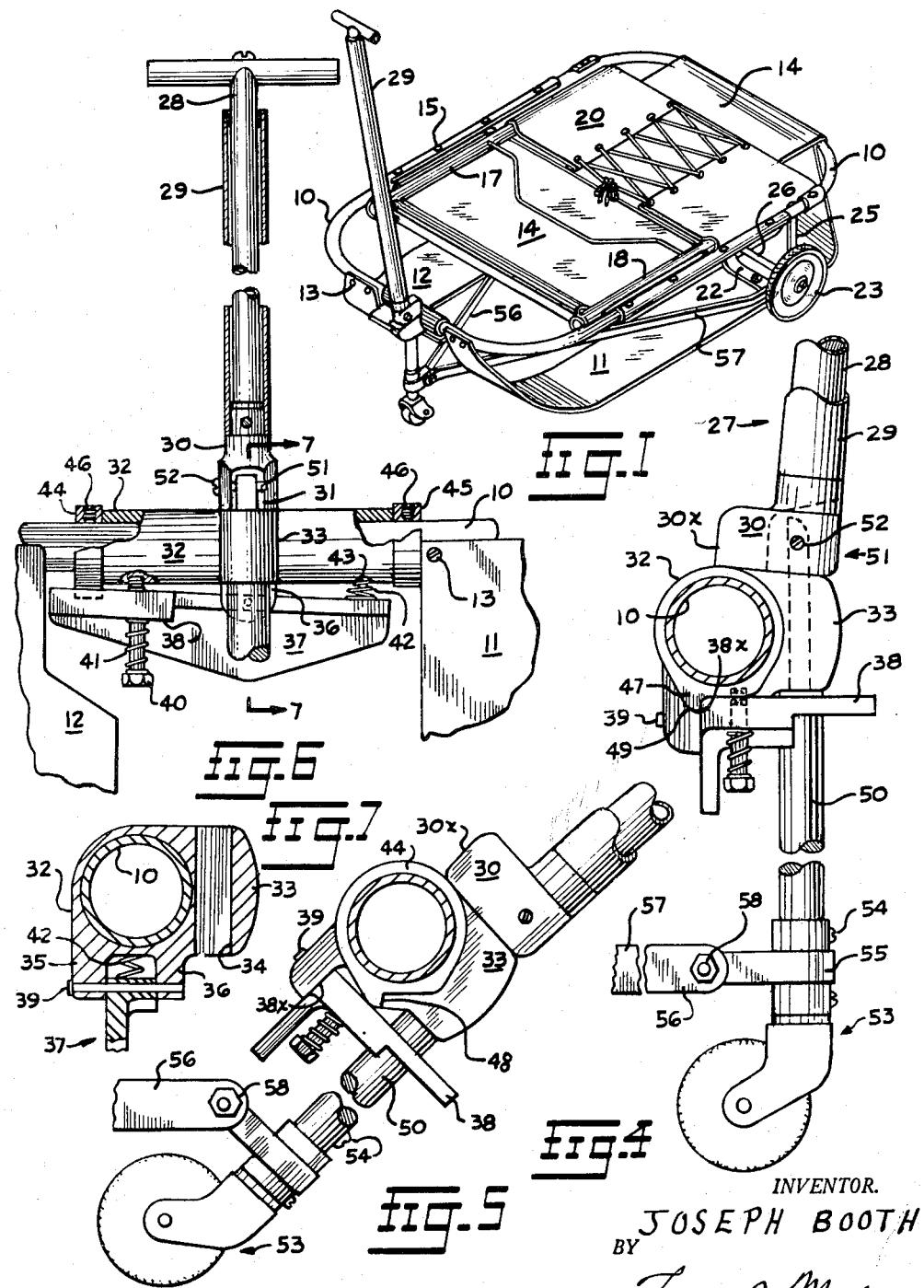
INVENTOR.
JOSEPH BOOTH
BY Frank Makara
ATTORNEY April 9, 1963 J. BOOTH 3,084,947
UNIVERSAL CARRIAGE
Filed May 26, 1961 2 Sheets-Sheet 2
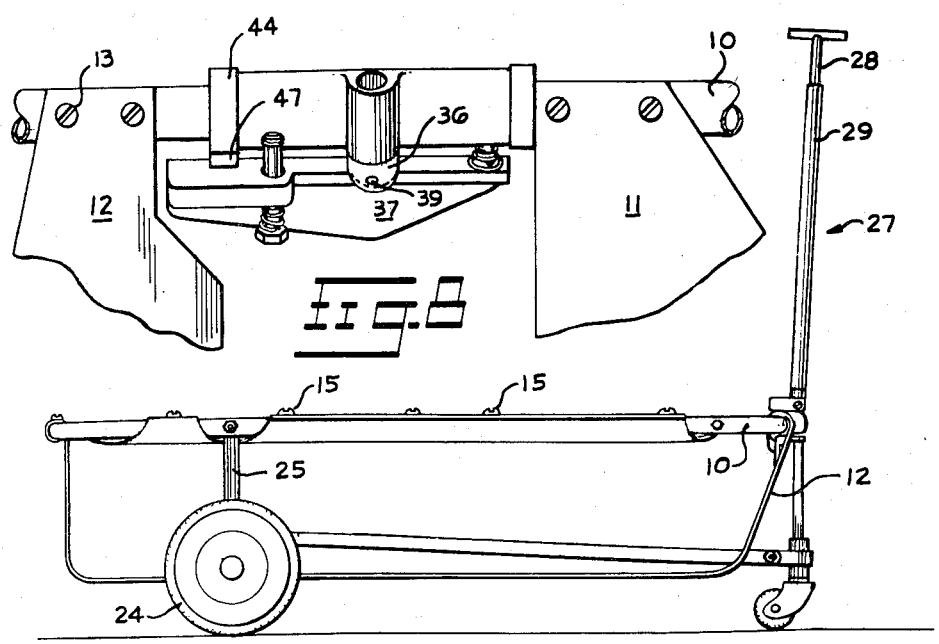
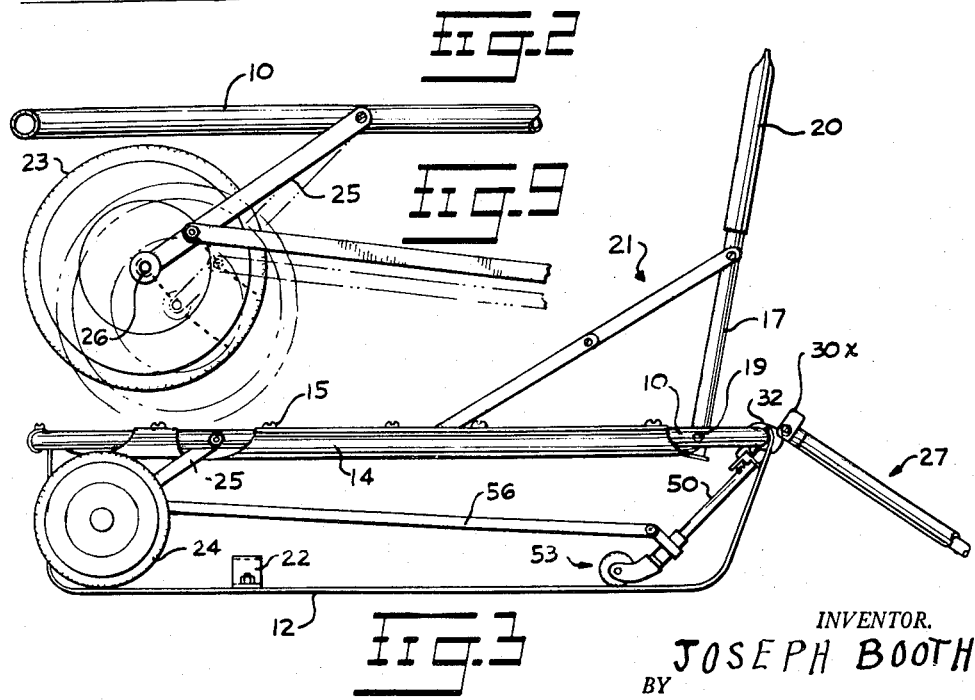
INVENTOR.
JOSEPH BOOTH
BY Frank Makora
ATTORNEY

United States Patent Office 3,084,947
Patented Apr. 9, 1963

3,084,947
UNIVERSAL CARRIAGE
Joseph Booth, 220 Spruce St., West Hempstead, N.Y.
Filed May 26, 1961, Ser. No. 121,281
2 Claims. (Cl. 280—11)

This invention relates to a carriage and more particularly to a carriage moveable on land, sand, snow, etc.

Many carriages or carts for moving goods are operable only on hard surfaces, for example, cement walks, and are useless when sandy or snowy conditions are encountered.

The carriage of this invention is suitable for universal use as for example, on hard surfaces, or when sandy terrain is encountered or even upon water.

A feature of this invention is the provision of retractable wheels for a base structure having skis or pontoon-skis.

A specific use for this inventive carriage is the moving of picnic and beach paraphernalia from a car in a parking lot to the water's edge on a sandy beach.

It is an object of this invention to provide a carriage for use under various conditions of terrain.

It is another object to provide a carriage of sturdy yet light weight construction.

It is another object to provide a compact carriage capable of being stored in the trunk compartment of an automobile.

These and other objects of this invention will become apparent upon reading the following descriptive disclosure taken in conjunction wtih the accompanying drawing in which:

FIG. 1 is a perspective view of the carriage,

FIG. 2 is a side view of the carriage with the wheels engaging the ground,

FIG. 3 is a side view of the carriage with the wheels in retracted position,

FIG. 4 is a side view, broken away in part, of the front wheel assembly in vertical position, FIG. 5 is a side view similar to FIG. 4 but showing the front wheel assembly in its retracted position, FIG. 6 is a front view of the handle means and of the locking means for locking the front wheel assembly in a vertical position, FIG. 7 is a section view taken on line 7—7 of FIG. 6 and showing the manner of rotatively securing the handle means to the carriage frame, FIG. 8 is a view showing the assembly locking means when the wheel assembly is disposed in the retracted condition, and FIG. 9 is a view showing by means of dotted lines the manner of elevating the rear wheels.

Turning now to the drawing, and particularly to FIGS. 1–3, the carriage of this invention comprises a rectangular frame 10 preferably of tubular aluminum to which a pair of wide somewhat U-shaped skis 11 and 12 are longitudinally secured as by screws 13.

A canvas platform 14 is secured by metal screws 15 to the top of the frame 10. Preferably a back rest made from a pair of tubular arms 17 and 18 is journaled by pivot pins 19 (FIG. 3) to the frame 10. A canvas back rest 20 is disposed over the opposed arms 17 and 18 thereby converting the carriage to a modified beach chair. As shown in FIG. 3, the back rest is limited in its rotation to an angle of a bit over ninety degrees by a pair of linkage arms 21 secured respectively to the back rest arms 17 and 18 and the frame 10.

As shown in the drawing, the frame 10 and its fixedly secured skis constitute a sled. Optionally the skis may be made in pontoon form so that the sled functions both as a sled and a pontoon boat. Thus the carriage may be pulled on sand, snow, ice or water.

Preferably, the skis 11 and 12 are secured together by a brace 22 (FIG. 3) to give rigidity to the sled. Other modifications within the skill of the art are possible.

According to this invention a three wheel retractable assembly is secured to the frame 10 in such a way as to permit quick conversion of a loaded carriage from the sled form into the wheeled form and vice versa, with a minimum of muscular effort.

The wheeled assembly of this invention lifts a heavily loaded sled by combined rolling and lifting action. In other words, the loaded sled is lifted on rotating wheels so that the skis are lifted off the ground with simultaneous engagement of rolling wheels with the ground.

To accomplish the above result a pair of suitably large rear wheels 23 and 24 are hingedly secured by a pair of arms 25 to the frame 10. The wheels 23 and 24 are provided with a common axle 26 (FIG. 1) so that both wheels are raised and lowered as a unit upon raising the hinge arms 25 secured to said axle 26.

The front end construction of the wheel assembly is of unique manufacture and includes a telescoped handle unit 27 having an inner tubular arm 28 disposed in a larger tubular outer arm 29. A shoe element 30 of solid metal is provided wtih a suitable cut-out channel 31 in the heel portion (FIG. 6). The shoe element 30 is welded to the bottom of the handle arm so that rotation of the arm on its longitudinal axis also rotates the shoe element 30.

A tubular sleeve 32 is provided with an integral centrally disposed abutment or ledge 33. An aperture 34 is disposed in said abutment 33 (FIG. 7). The sleeve 32 is provided with a pair of integral parallel centrally disposed spaced-apart rails 35 and 36.

A rocker arm 37 having a foot plate 38 is disposed between said rails 35 and 36 and a pivot pin 39 is disposed through suitable apertures provided in said rails and said rocker arm. A threaded bolt 40 is disposed through a suitable aperture in the foot plate 38 and then into a suitable threaded aperture in sleeve 32. A spring 41 is disposed between the head of bolt 40 and the foot plate continuously urging the foot plate upwardly toward the sleeve 32. A compression spring 42 is disposed on the other end of the rocker arm 37 (FIG. 6) and against sleeve 32, being held in place against displacement by the head of a screw 43.

The rotatable sleeve 32 is held non-slidably on frame 10 between a pair of spaced-apart collars 44 and 45, said collars being fixedly secured to frame 10 by suitable set-screws 46. Fixed collar 44 is provided with a locking lip 47 having a flat vertical front surface 48 (FIG. 5) and a suitably curved rear surface 49.

The operation of the foot releaseable rock arm 37 is effected by stepping on the foot plate 38 (FIG. 4) until the top surface of the foot plate 38 is disposed below the bottom edge of the vertical surface 48, whereupon the handle assembly is turned downwardly causing the top surface of the foot plate 38 to rub rotatingly against the curved back surface 49 of the locking lip 47. The locking lip 47 is stationary at all times and the front wheel assembly with its handle means is rotated against and under said lip.

When the front wheel assembly is in a retracted position (FIGS. 3 and 5), the carriage becomes a sled. To convert the sled to the wheeled carriage the handle 27 is rotated so that the toe 30X of the shoe 30 is disposed on top of the sleeve 32 (FIG. 5) and the handle is then moved counterclockwise or toward the rear of the frame 10 thereby pushing the carriage wheels into engagement with the floor followed by a lifting action of the sled with a simultaneous rolling action of the wheels.

As shown in the drawing, the front wheel assembly is disposed below the sleeve 32 and its rocker arm locking means. The front wheel assembly comprises a cylindrical rod 50 having a fixed spindle 51 at its top adapted to pass through aperture 34 of the abutment 33 and into the channel 31 of shoe 30. A pivot pin 52 is disposed through the shoe channel walls and through a suitable aperture in the spindle 51.

A conventional small caster wheel assembly 53 is secured to the rod 50 by means of screws 54 and a holding clip 55 is disposed around the rod 50 in suitable spaced-relationship to the sleeve 32. A pair of suitably bent link bars 56 and 57 having suitable apertures at each end are disposed on the axle 26 adjacent a respective rear wheel 24 and 23. The front apertures of the bars 56 and 57 are pivotally secured by means of a pivot pin 58 to the holding clip 55 through suitable apertures therein.

In the lifting of a loaded carriage from its sled position (FIG. 3) into its wheeled carriage position (FIG. 2) the handle 27 is lifted and rotated counterclockwise so that the toe 30X of the shoe 30 engages the sleeve 32 placing the axis of handle tubular element 29 in linear axial relationship to the wheel assembly rod 50 (FIG. 3). Continued counterclockwise rotation of the handle then pulls the front wheel and the rear wheels as a unit due to the arms 56 and 57 until the wheel support arms 25 are in a vertical position. During this rotation of the rod 50, the foot plate 38 slides against the back curved surface 49 of the locking lip 47 due to spring 41 until the rear edge 38X of plate 38 slips off the curved surface 49 and engages the vertical surface 48.

To lower the carriage onto the skis, the foot plate is depressed below the vertical surface 48 and the handle 27 is rotated clockwise.

This invention has been described by means of an illustrative embodiment but it is of a broader scope. Thus the skis 11 may be, and preferably are, grooved, longitudinally from end to end. This groove in the skis may be U-shaped or V-shaped and facilitates operation of the sled on sand or snow.

Also the coil spring 42 may be replaced by a leaf spring. The canvas platform 14 may be replaced by plastic webbing. Moreover the conventional linkage arms 21 may be replaced by other types of hinge means serving to limit the rotational movement of the back rest 20.

Moreover the extension of the handle unit 27 may be accomplished by other conventional means.

Accordingly this invention is limited only by the claims herein.

I claim:
1. A convertible carriage adapted for being selectively changed from a sled form to a wheeled form comprising a substantially rectangular tubular round frame; a pair of suitable spaced-apart parallel disposed skis secured suitably to the underside of the frame; a sleeve disposed rotatably upon the front portion of said round frame, said sleeve having an integral normally horizontal forward ledge having a vertical aperture therein and having an integral depending rail means adjacent to said ledge; a rocker arm having a foot pedal hingedly disposed on said rail means; a pair of collars fixedly disposed on said frame adjacent each end of said sleeve, one of said collars being a locking collar having a depending locking lug adapted to engage said foot pedal; spring means disposed at one end on said rocker arm and engaging said sleeve for urging the other end of said rocker arm into engagement with said locking collar depending lug; a shank protrudingly disposed through said vertical aperture of said ledge; handle means hingedly secured to said protruding portion of said shank; front wheel means having a small swivel wheel secured to the base of said shank; a pair of large rear wheel means each having a swingable plate respectively secured hingedly to each side of said frame adjacent the rear portion, and link means securing said rear wheel means and said front wheel means whereby selective rotation of said sleeve and said handle as a unit swings the front and the rear wheels simultaneously to engage and disengage the ground.

2. The carriage of claim 1 wherein the base of said handle is provided with fulcrum shoe means disposed on said ledge whereby selective rotation of said handle disposes said fulcrum means selectively on said ledge of said sleeve facilitating lifting of said frame with minimum effort.

References Cited in the file of this patent

UNITED STATES PATENTS

| | | |
|---|---|---|
| 630,987 | Nylander | Aug. 15, 1899 |
| 2,077,265 | Reed | Apr. 13, 1937 |
| 2,461,609 | Light | Feb. 15, 1949 |
| 2,665,139 | Schroeder | Jan. 5, 1954 |
| 2,926,021 | Altadonna | Feb. 23, 1960 |

FOREIGN PATENTS

| | | |
|---|---|---|
| 36,014 | Switzerland | Jan. 25, 1906 |
| 827,158 | Germany | Jan. 7, 1952 |